(12) United States Patent
Chen et al.

(10) Patent No.: US 7,776,976 B2
(45) Date of Patent: Aug. 17, 2010

(54) METHOD FOR SYNTHESIS OF BUTYL RUBBER

(75) Inventors: Jian-Feng Chen, Beijing (CN); Hua Gao, Beijing (CN); Yi-Xian Wu, Beijing (CN); Hai-Kui Zou, Beijing (CN); Guang-Wen Chu, Beijing (CN); Lei Zhang, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 60 days.

(21) Appl. No.: 12/307,121

(22) PCT Filed: Jul. 20, 2007

(86) PCT No.: PCT/CN2007/002221

§ 371 (c)(1),
(2), (4) Date: Dec. 30, 2008

(87) PCT Pub. No.: WO2008/025212

PCT Pub. Date: Mar. 6, 2008

(65) Prior Publication Data

US 2009/0286948 A1    Nov. 19, 2009

(30) Foreign Application Priority Data

Aug. 25, 2006  (CN) ...................... 2006 1 0112605

(51) Int. Cl.
*C08F 2/01* (2006.01)
*C08F 236/08* (2006.01)
*B01J 8/10* (2006.01)
*B01J 8/12* (2006.01)
*B01J 8/38* (2006.01)

(52) U.S. Cl. ................ 526/88; 526/339; 422/209

(58) Field of Classification Search .......... 422/209; 526/339, 88; *B01J 8/10, 8/12, 8/38*
See application file for complete search history.

(56) References Cited

U.S. PATENT DOCUMENTS 3,660,366 A * 5/1972 Horie ..................... 526/67
4,096,320 A * 6/1978 Verde et al. ............. 526/72
7,662,900 B2 * 2/2010 Seidl et al. ............ 526/348.7
2005/0159565 A1 * 7/2005 Jung et al. ................ 526/72

FOREIGN PATENT DOCUMENTS

| CN | 1020036 | 3/1993 |
| CN | 1021294 | 6/1993 |
| CN | 1116146 | 2/1996 |
| CN | 1038578 | 6/1998 |
| CN | 2523482 | 12/2002 |
| CN | 1461731 | 12/2003 |
| CN | 1507940 | 6/2004 |
| CN | 1704155 | 12/2005 |
| CN | 1743064 | 3/2006 |
| CN | 1752006 | 3/2006 |
| CN | 2768867 | 4/2006 |
| CN | 1271183 | 8/2006 |

OTHER PUBLICATIONS

Briskman, Polymerization Under Microgravity Conditions: Results and Perspectives, Polymer Preprints, 2000, 41 (1), 1054-1055.*
Machine translated English equivalent of CN 1743061.*
International Preliminary Report on Patentability for PCT/CN2007/002221, Mar. 3, 2009, 5 pages. Note: PCT/CN2007/002221 is the same as the instant invention.*

* cited by examiner

*Primary Examiner*—Milton I Cano
*Assistant Examiner*—Brieann Fink
(74) *Attorney, Agent, or Firm*—J.C. Patents

(57) ABSTRACT

This invention puts forward a process of preparing butyl rubber. High gravity devices are used as polymerization reactor. The mixture of isomonoolefin and conjugated diolefin monomers and the diluent, and the mixture of the initiator and diluent are pumped at a certain ratio into a high-gravity reactor to conduct cationic polymerization in the high-gravity environment. After polymerization, the monomers and the diluent are removed from the product to obtain butyl rubber polymers with number-average molecular weight of 80000~300000 and molecular weight distribution index of 1.9~3.6. The high gravity polymerization method of this invention can tremendously intensify micro-mixing, mass transfer and heat transfer in the reaction. Compared to the conventional stirred polymerization method, this invention features small reactor volume, at least 30-fold shorter residence time of substances in the high gravity reactor, low cost, low energy consumption and high production efficiency.

12 Claims, 1 Drawing Sheet

METHOD FOR SYNTHESIS OF BUTYL RUBBER

This application is a 371 national stage of PCT/CN2007/002221, filed Jul. 20, 2007.

FIELD OF THE INVENTION

The present invention relates to a method of preparing butyl rubber, which is synthesized by slurry polymerization, and also to the application of high gravity technology in the polymerization engineering.

BACKGROUND OF THE INVENTION

Butyl rubber is commonly synthesized by slurry copolymerization of isobutylene and a minor amount of isoprene (1~3%) in chloromethane medium, initiated by Friedel—Crafts acid (such as $AlCl_3$). Butyl rubber polymers are insoluble in chloromethane and precipitate as particles from the solution to form the slurry system. The polymerization is carried out at the temperature about −100° C. The reaction rate is extremely rapid, resulting in an instantaneous completion of the reaction. High molecular weight butyl rubber products for applications as rubber can only be obtained at low polymerization temperature (see US Pat. No. 2,356,128 and Ullmanns Encyclopedia of Industrial Chemistry, Vol. A23, 1993, Page 288-295). It is very important to intensify heat transfer, mass transfer and micro-mixing in butyl rubber polymerization since they play an important role in the process. However, butyl rubber is commonly synthesized by a conventional stirred polymerization reaction, which features poor micro-mixing and long residence time of the substances (30-60 min), unmatched to the polymerization rate of butyl rubber. In addition, the conventional process also features large equipment volume, large floor area and high cost.

The recently-developed high gravity technology has changed conventional mass transfer means. The core of the technology is that mass transfer of liquid-liquid, liquid-solid, gas-liquid is carried out in a high gravity reactor, where mass transfer and micro-mixing can be intensified tremendously. The rate of mass transfer, the mass transfer coefficient of micro-mixing and the mixing rate in high gravity environment are therefore 1~3 orders of magnitude larger than those in a conventional static state (gravity environment). High gravity devices are disclosed in China Patents, Appl. Nos. 91109255.2, 91111028.3, 200520100685.3, 01268009.5, 02114174.6, 200510032296.6, which comprise high gravity rotating equipment such as rotating packed bed, zigzag channels, helix channels, rotating disks. A rotor/stator high gravity rotating device is also disclosed in China Pat. No. ZL 200410042631.6. The inventors of this invention have made significant contributions to high gravity technology and extended its applications from separation and desorption to chemical reaction processes. For instance, a series of patents describe the preparation of nanoparrticles by a precipitation reaction in a high gravity rotating packed bed reactor, such as "Synthesis method of ultrafine particles" (CN. Pat. No. ZL 95105344.2) and "Synthesis method of ultrafine calcium carbonate" (CN. Pat. No. ZL 95105343.4). The patent of "Preparation method of overbased calcium sulphonate lubricant detergent additives" (CN. Pat. No. ZL 200410037885.9) discloses the applications of high gravity technology to neutralization reaction, carbonation and phase inversion processes, and calcium sulfonate detergent additives with high quality are obtained. The above said applications of high gravity technology are all for inorganic reactions, and there are no reports on the applications of high gravity technology to complex macromolecule polymerization, which comprises the chain initiation, chain propagation and chain termination.

DETAILED DESCRIPTION OF THE INVENTION

The invention applies high gravity technology to butyl rubber polymerization, in which the mass transfer, heat transfer and micro-mixing are intensified significantly to match the polymerization rate of butyl rubber. This invention thus discloses the synthesis method of butyl rubber under high gravity conditions, which exhibits features of high efficiency, low energy consumption, low cost and controlled molecular weight distributions.

The major procedure of the invention comprises: prechilling the monomers and diluent mixture and the initiator and diluent mixture to a set temperature desirable for the polymerization; feeding the mixtures into a high gravity reactor with the volumetric ratio of the monomers and diluent mixture to the initiator and diluent mixture as 10-20 to 1 to conduct the cationic polymerization in high gravity environment; controlling the reaction temperatures lower than −80° C. and the high gravity level between 15-670 g's (g represents the gravitational force, 9.8 m/sec$^2$) ; the average residence time of substances in the high gravity reactor is less than 1 min; post-treating the resultant by removing the diluent, washing and drying to obtain butyl rubber polymers. The said monomers mixture comprises isomonoolefin and conjugated diolefin.

It is preferable that the above said isomonoolefin is isomonoolefin with 4 to 16 carbon atoms, more preferably with 4 to 7 carbon atoms, such as isobutylene, 2-methyl-1-butene, 3-methyl-1-butene, 2-methyl-2-butene or 4-methyl-1-pentene, and mixtures thereof. Isobutylene is the most preferable.

The above said conjugated diolefin may adopt the conjugated diolefin which is widely-known by technicians of this domain and can copolymerize with isomonoolefin. It is preferable that the conjugated diolefin comprises 4 to 14 carbon atoms, such as isoprene, butadiene, 2-methyl-butadiene, 2,4-dimethyl-butadiene, 1,3-pentadiene, 3-methyl-1,3-pentadiene, 2,4-hexadiene, 2-neopentyl-butadiene, 2, 5-dimethyl-2, 4-hexadiene, cyclopentadiene, methyl-cyclopentadiene, cyclohexadiene, 1-ethenyl-cyclohexadiene, and combinations thereof. Isoprene is more preferable.

It is preferred that the said monomers mixture comprises 95-99.5 wt. percent of isomonoolefin and 0.5-5 wt. percent of conjugated diolefin, wherein isobutylene is most preferred as isomonoolefin monomer and isoprene is most preferred as conjugated diolefin monomer.

The above said initiator is the Friedel—Crafts acid widely-known for the synthesis of butyl rubber by slurry polymerization, which comprises $AlCl_3$, $TiCl_4$, $SnCl_4$, $BF_3$, or $BCl_3$ etc.

The above said diluent is the inert solvent or diluent for butyl rubber polymerization and widely-known by technicians of this domain. Chlorinated hydrocarbon, such as chloromethane and dichloromethane, is preferred.

The above said polymerization temperature is the usual cationic polymerization temperature. The preferable temperature range is from −120to −70° C., more preferably from −120to −80° C. The pressure is the atmospheric pressure.

High gravity reactors of this invention are the ones adopted in the existing technologies, including rotating packed bed, zigzag channels, helix channels, rotating disks and rotor/stator etc. rotating devices.

High gravity level means the centrifugal acceleration resulting from the rotation of the rotor in the high gravity reactor and is usually denoted by the multiple of gravitational acceleration (g). It mainly relates to the rotating speed and the inner and outer diameters of the rotor. High gravity level ($g_r$) can be expressed by the following equation:

$$g_r = \omega^2 r = \left(\frac{2\pi n}{60}\right)^2 \sqrt{\frac{(r_1^2 + r_2^2)}{2}}$$

where: n is the rotating speed of the rotor, revolutions per minute.

$r_1$ is the inner diameter of the rotor, and $r_2$ is the outer diameter of the rotor The effect of the invention: due to the high-speed rotation of the rotor in the high gravity reactor, a stable high gravity environment is formed, which can reach several hundred times larger than gravitational acceleration on the earth. Under the high gravity environment created by the rotating packing, zigzag channels or helix channels, the reactants for butyl polymerization feature excellent dispersion, strong turbulence, strong mixing and rapidly renewed interface and contact at very high relative velocity in the tortuous channels. Mass transfer and heat transfer can be intensified tremendously, and complete micro-mixing state of the reactants can be achieved quickly in this process. Compared to the conventional stirred polymerization, the residence time of substances in the high gravity reactor can be shorten at least 30 times. This process also exhibits low energy consumption, high production efficiency and small floor area.

In addition, butyl rubber polymer with number-average molecular weight of 80000~300000 and molecular weight distribution index of 1.9~3.6 can be obtained by changing reactive monomer concentration, monomer/initiator ratio, polymerization temperature and high gravity level.

DESCRIPTION OF THE EMBODIMENTS

Figure 1:
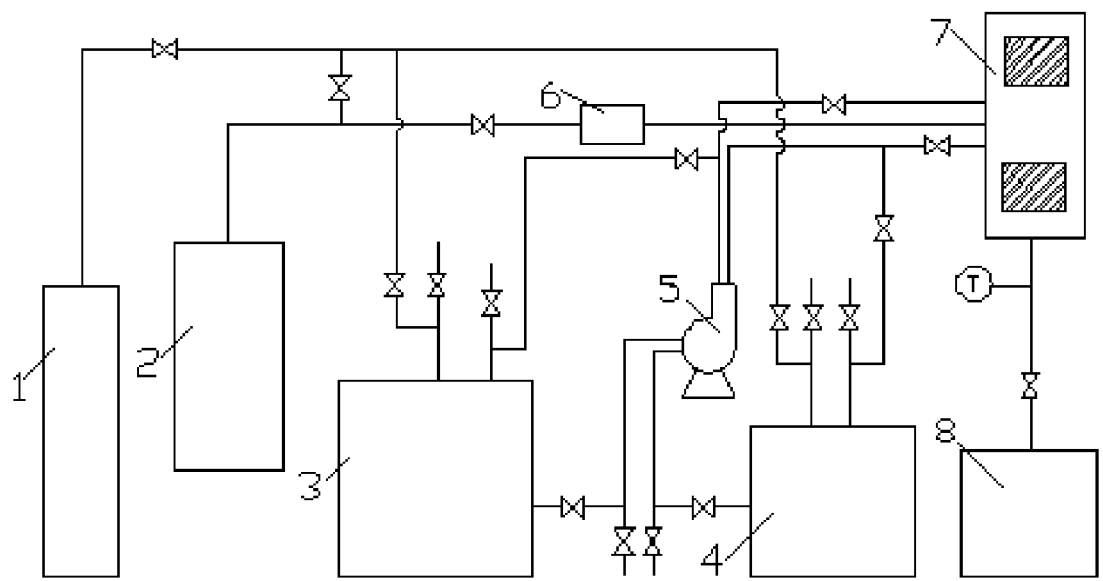
FIG. 1 is the process flow diagram of the invention.

The present invention will be explained in more details with reference to the following figure and examples, but the invention is not limited by the listed examples. It comprises any widely-known changes to butyl rubber polymerization under high gravity conditions described in this invention.

FIG. 1 is one embodiment of the invention. All the pipelines and equipment are swept by pure nitrogen from cylinder 1 before use in order to remove air and the vapor. The isomonoolefin and conjugated diolefin monomers mixture and the diluent (such as dichloromethane) are mixed at the ratio required by the reaction and prechilled in storage container 3. The initiator mixture comprising the diluent (such as dichloromethane) and the initiator (such as $AlCl_3$) at a certain ratio are mixed and prechilled in storage container 4. The preparation method of the mixed solutions and the ratio of the components are commonly employed. When the temperatures of the solutions in storage containers 3 and 4 reach the polymerization temperature, the pipeline and the high gravity reactor are prechilled by the coolant from container 2. The solutions in storage containers 3 and 4 are then pumped at a certain ratio into high gravity reactor 7 via metering pump 5 and liquid distributors (High gravity reactor is the above said high gravity rotating devices disclosed in Pat. Appl. Nos. 91109255.2, 91111028.3, 200520100685.3, 01268009.5, 02114174.6, 200510032296.6, CN 200410042631.6). The slurry copolymerization of the reactants is carried out in the rotating packing, zigzag channels, helix channels or rotating disks in the high gravity reactors. The as-synthesized product is collected by container 8 with the presence of the terminator and post-treated by removing the diluent, washing and drying, as commonly employed in the field, to obtain butyl rubber polymers.

The above said process may adopt continuous feeding or batch feeding according to the methods widely-known by professionals in this field.

EXAMPLE 1

Rotating packed bed was employed as the high gravity reactor in the following examples.

All the pipelines and equipment were swept by pure nitrogen from cylinder 1 before use in order to remove air and the vapor. Monomers mixture of 98 wt. percent of isobutylene and 2 wt. percent of isoprene and 7000 ml of dichloromethane were added into storage container 3. 685 ml of the mixture of dichloromethane and $AlCl_3$ was added into storage container 4. The two solutions in storage containers 3 and 4 were prechilled to about $-100°$ C. and then pumped respectively into rotating packed bed 7 by double plunger metering pump 5. High gravity level was set at 90 g's through controlling the rotator speed of the rotating packed bed reactor. The feeding ratio of the solution in storage container 3 to that in storage container 4 was 13:1 (volumetric ratio). The reaction temperature in the rotating packed bed reactor was about $-100°$ C. and the average residence time of substances in the reactor was less than 1 min. The product was collected by container 8 with the presence of the terminator and post-treated by removing the diluent from the product prior to analyses. Butyl rubber polymer with number-average molecular weight of $1.9 \times 10^5$ and molecular weight distribution index of 2.45 was obtained.

EXAMPLE 2

The process and procedure were the same as Example 1 except that the monomers mixture comprised 98.5 wt. percent of isobutylene and 1.5 wt. percent of isoprene, and the polymerization temperature was about $-83°$ C. Butyl rubber polymer with number-average molecular weight of $1.5 \times 10^5$ and molecular weight distribution index of 2.70 was obtained.

EXAMPLE 3

The process and procedure were the same as Example 1 except that the monomers mixture comprised 99 wt. percent of isobutylene and 1 wt. percent of isoprene. Butyl rubber polymer with number-average molecular weight of $3.0 \times 10^5$ and molecular weight distribution index of 2.65 was obtained.

EXAMPLE 4

The process and procedure were the same as Example 1 except that the monomers mixture comprised 97 wt. percent of isobutylene and 3 wt. percent of isoprene, and the polymerization temperature was about $-120°$ C. Butyl rubber polymer with number-average molecular weight of $2.6 \times 10^5$ and molecular weight distribution index of 2.28 was obtained.

EXAMPLE 5

The process and procedure were the same as Example 1 except that the high-gravity level was 15 g's. Butyl rubber polymer with number-average molecular weight of $0.8\times10^5$ and molecular weight distribution index of 3.60 was obtained.

EXAMPLE 6 the process and procedure were the same as Example 1 except that the high-gravity level was 670 g's. Butyl rubber polymer with number-average molecular weight of $2.65\times10^5$ and molecular weight distribution index of 2.54 was obtained.

EXAMPLE 7

The process and procedure were the same as Example 1 except that the feeding ratio of the solution in container 3 to that in container 4 was 10:1 (volumetric ratio). Butyl rubber polymer with number-average molecular weight of $1.5\times10^5$ and molecular weight distribution index of 2.80 was obtained.

EXAMPLE 8

The process and procedure were the same as Example 1 except that the feeding ratio of the solution in container 3 to that in container 4 was 20:1 (volumetric ratio). Butyl rubber polymer with number-average molecular weight of $2.85\times10^5$ and molecular weight distribution index of 1.98 was obtained.

The invention claimed is:

1. A method for synthesizing butyl rubber by a slurry polymerization process, wherein the method comprises: prechilling a monomers and diluent mixture and an initiator and diluent mixture to a set temperature desirable for the polymerization process; feeding the mixtures into a high gravity reactor with a volumetric ratio of the monomers and diluent mixture to the initiator and diluent mixture of 10-20 to 1 to conduct the cationic polymerization; and controlling reaction temperatures to be lower than $-80°$ C. and controlling a high gravity level to be between 15-670 g (g represents the gravitational force, 9.8 m/sec$^2$) by rotating a rotor of the high gravity reactor during the polymerization process.

2. The method of claim 1, wherein the high gravity reactor comprises a rotating packed bed, zigzag channels, helix channels, rotating disks and rotor-stator high gravity rotating devices.

3. The method of claim 1, wherein the monomers comprise isomonoolefin that has 4 to 16 carbon atoms.

4. The method of claim 1, wherein the monomers comprise conjugated diolefin that has 4 to 14 carbon atoms.

5. The method of claim 1, wherein the monomers comprise 95-99.5 wt. percent of isomonoolefin and 0.5-5 wt. percent of conjugated diolefin.

6. The method of claim 3, wherein the isomonoolefin is isobutylene.

7. The method of claim 1, wherein the diluent is chloromethane.

8. The method of claim 1, wherein the polymerization process is carried out at a temperature of $-120$ to $-80°$ C.

9. The method of claim 4, wherein the conjugated diolefin is isoprene.

10. The method of claim 1, wherein the diluent is dichloromethane.

11. A method for synthesizing butyl rubber by a slurry polymerization process, comprising:

prechilling a monomers and diluent mixture and an initiator and diluent mixture to a set temperature desirable for the polymerization process;

feeding the mixtures into a high gravity reactor with a volumetric ratio of the monomers and diluent mixture to the initiator and diluent mixture of 10-20 to 1 ;

controlling reaction temperatures to be lower than $-80°$ C.; and controlling a high gravity level to be between 15-670 g (g represents the gravitational force, 9.8 m/sec$^2$), wherein the high gravity reactor comprises a rotating packed bed, zigzag channels, helix channels, a rotating disk and a rotor-stator high gravity rotating device.

12. The method of claim 11, further comprising:

post-treating resultant from the polymerization process by removing the diluent, washing and drying to obtain butyl rubber polymers.

* * * * *